United States Patent [19]

Linhart

[11] 3,889,716
[45] June 17, 1975

[54] REINFORCED FLEXIBLE HOSES AND THEIR MANUFACTURE

[75] Inventor: Georg Linhart, Ober-Wollstadt, Germany

[73] Assignee: Techn-Chemie Kessler & Co. GmbH, Frankfurt, Germany

[22] Filed: Sept. 21, 1973

[21] Appl. No.: 399,434

[30] Foreign Application Priority Data
Sept. 28, 1972  Germany.......................... 2247554

[52] U.S. Cl................................. 138/129; 138/131
[51] Int. Cl............................................... F16l 11/00
[58] Field of Search ............ 138/129, 154, 131, 122

[56] References Cited
UNITED STATES PATENTS

| 2,486,387 | 11/1949 | Bringolf............................ | 138/122 |
| 3,297,055 | 1/1967 | Beck................................. | 138/129 |
| 3,323,553 | 6/1967 | Richitelli et al................... | 138/122 |

Primary Examiner—James J. Gill
Assistant Examiner—Anthony V. Ciarlante
Attorney, Agent, or Firm—Hane, Baxley & Spiecens

[57] ABSTRACT

There is disclosed a reinforced flexible hose. This hose is formed of a helically wound form-retaining support coil, for instance a wire coil, about which is helically wound a flexible ribbon so that the marginal lengthwise edges of the ribbon overlap each other in juxtaposition with the underlying convolutions of the coil. The ribbon forms an inner layer and a second or outer layer is formed by winding a second flexible ribbon upon the coil in the same direction as the first ribbon. The marginal edges of the second ribbon also overlap in juxtaposition to the convolutions of the coil. The overlapping edge portions of the second ribbon are bonded to each other and also to the overlapping portions of the first ribbon which, in turn, are secured to the underlying convolutions of the coil. The ribbon portions of the two ribbons spanning the spaces between the convolutions are substantially parallel to each other and not bonded together.

4 Claims, 4 Drawing Figures

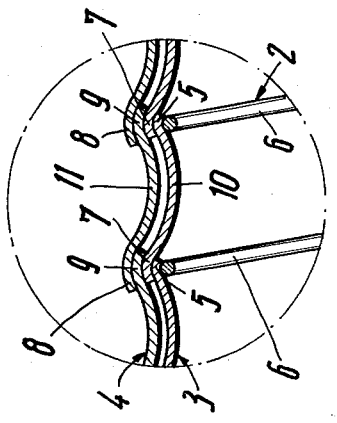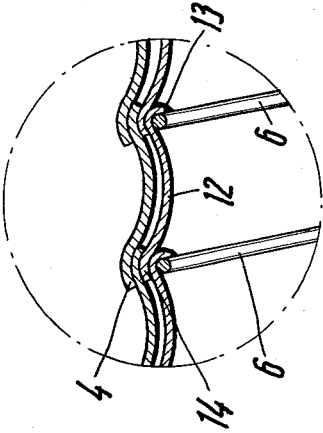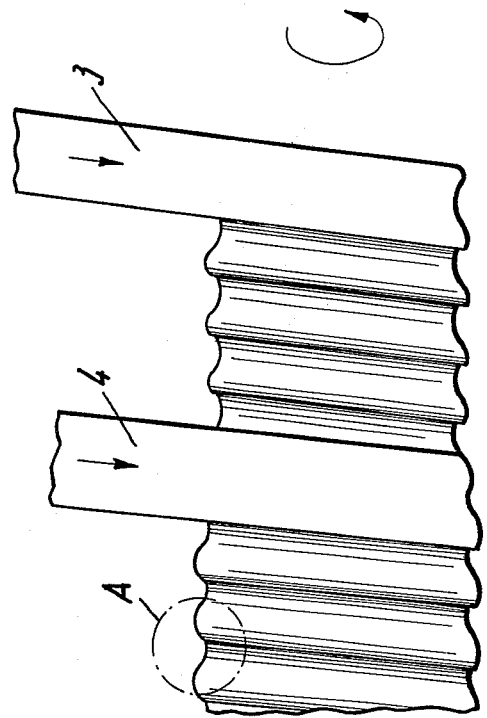

REINFORCED FLEXIBLE HOSES AND THEIR MANUFACTURE

The present invention relates to reinforced flexible hoses made from rubber, synthetic plastics or the like.

More particularly, the invention concerns those reinforced flexible hoses in which the reinforcement comprises a support coil; an inner hose formed from a section band or ribbon helically wound in the same direction as in the support coil, the windings of the band overlapping in the region of those of the support coil and thereby forming undulating ridges; and an outer hose surrounding the inner hose.

A hose of this kind has been described, for example, in the Austrian Pat. Specification No. 239,019. The inner wall of this known hose is almost completely smooth, since the section band consists of a median plane web and arcuate edges. One of the arcuate edges grips directly the support coil whereas the second arcuate edge has a larger diameter and overlappingly engages the adjacent part of the hose. An outer hose is applied to the inner hose thus formed. The outer hose can be formed on the inner hose by blowing or extruding, or in such a manner that a hose of larger diameter is drawn over the inner hose and subsequently shrunk thereon by cooling.

It is the object of this invention to improve the strength of such hoses and to simplify and cheapen their manufacture.

This object is achieved, in accordance with the invention, in that the outer hose is equally formed by a band which is wound on the inner hose with the same winding direction and so that the overlapping edges of the outer band register with those of the inner hose and are connected to the latter.

Such a flexible hose is double-walled in the spacings between the windings of the support coil, and the inner and outer walls are preferably parallel to each other. In the region of the support coil the walls are interconnected, which can be done in a known manner by welding or by glueing.

The invention also provides a new flexible hoses, wherein a first band is continuously wound spirally on the support coil in such a way that one edge of the band lies directly on the windings of the coil and the other edge of the part of the band just being wound overlaps the last preceding part of the already wound hose, the two overlapping edges of the band are connected on the one hand to the coil and on the other hand to each other; then a second band is wound on the first band in such a manner that the edges of the second band overlap and register with those of the first band and are in addition connected to the latter.

Thus the second band is wound on the first band in the same manner as the first band is wound on the support coil. Both bands overlap each other in the region of the windings of the coil, and the spacings of the hose between the windings are thus made double-walled. Furthermore, since the inner and outer walls are both slightly undulating, the hose is well flexible. The improved strength of a hose according to the invention, as copared to the aforesaid known hoses arises from the multiple overlap of the bands in the region of the windings of the coil and that no parts which produce shear stresses are used in the manufacture of the hose.

Embodiments of the invention are illustrated, by way of example, in the accompanying drawings, wherein:

FIG. 2 is a fragmentary elevation of the hose in the course of manufacture, with both bands being wound concurrently;

FIG. 3 is a detail, on a larger scale, in longitudinal section in the area A of FIG. 2, and FIG. 4 is a view similar to FIG. 3 of another embodiment.

Figure 1:
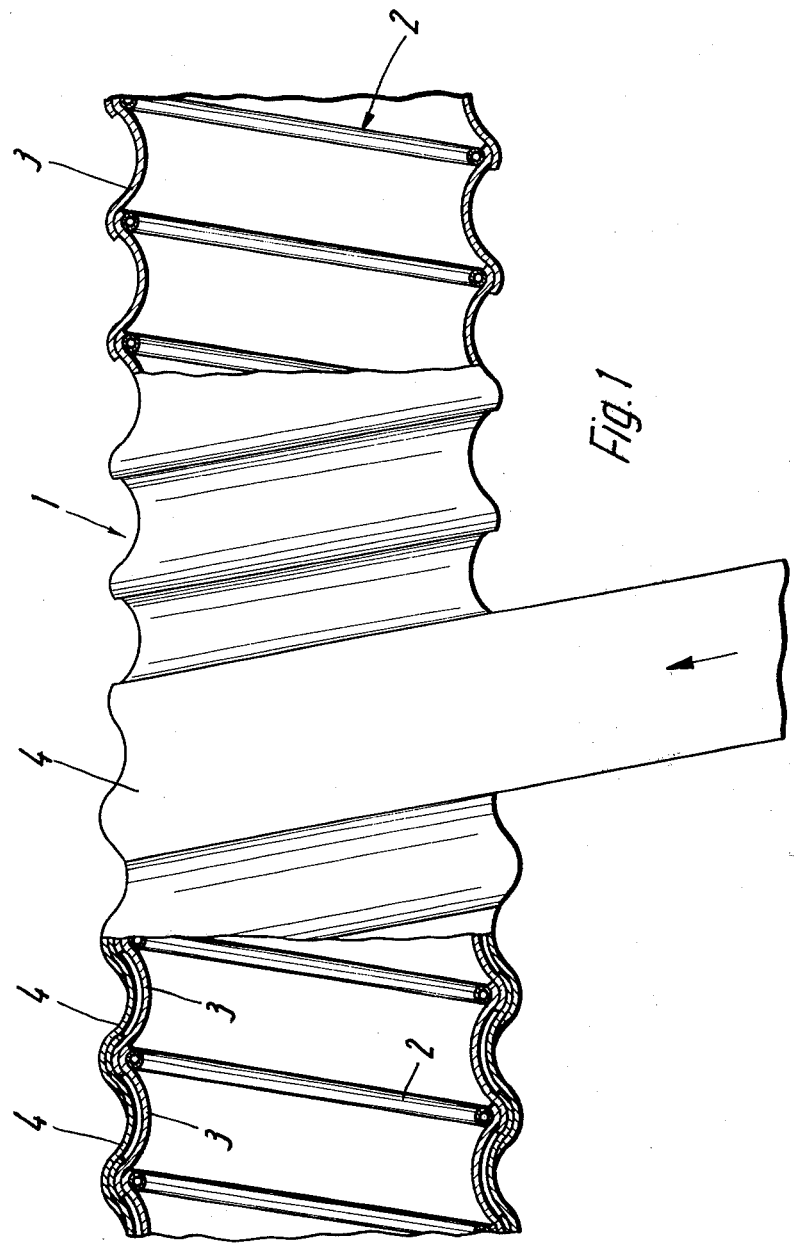
FIG. 1 is a fragmentary, part-sectional elevation of a hose according to the invention showing the second band in the course of being wound.

The hose 1 here illustrated comprises a support coil 2 on which two section bands 3,4 are wound.

The support coil 2 may be a common metal wire, or it may consist of synthetic resin, or else it may be a metal wire having an elastomer coating. Ribbon or band 3 is continuously wound on the coil 2 spirally so that its one edge 5 (FIG. 3) lies on the convolutions or windings 6 of the coil 2 and its other edge 7 overlaps the edge 5 of the preceding winding of the band. The edges 5 and 7 are connected or bonded to the coil 2 and to each other, e.g., by glueing or welding.

After the inner hose has thus been formed the second band 4 is wound on the first band so that its overlapping edges 8 and 9 register with the overlapping edges 5 and 7 of the first band 3. These edges 8 and 9 are also connected to each other and to the inner hose.

FIGS. 3 and 4 show furthermore that the hose is double-walled in the springs between the windings 6 of the coil the inner wall 10 running parallel to the outer wall 11. When the hose lies straight, both the inner and outer walls are outwardly concavely, whereas the overlapping and interconnected zones which register with the windings 6 of the coil 2, bulge outwardly convexly. Such an undulating configuration of the hose can be achieved by the use, for its manufacture, of bands having from the outset the desired curved cross-section, or bands whose width is so much larger than the spacings of the windings 6 of the coil that when the bands are wound in the described manner, their parts between the windings of the coil assume the desired curvature. FIGS. 3 and 4 also show that the outer band 4 is wider than the band 3, whereby the overlapping areas at the edges 8 and 9 of the band 4 are much larger than those of the overlapping edges 5 and 7 of the band 3.

The bands 3 and 4 may be fed to a winding device (not shown) from bobbins, or from extruders. Preferably both bands are wound concurrently on the coil with a slight axial spacing from each other.

The second embodiment shown in FIG. 4 differs from the one shown in FIG. 3 in that the inner band 12 has along one of its edges, which lies on the windings 6 of the coil 2, a hook-shaped strip 13, which envelops the windings of the coil at least partly. This results in a better grip on the coil along one edge of the band 12, while the other edge 14 of the band overlaps the adjacent winding of the band.

The hook-shaped strip 13 is either preformed in the band 12 or produced while the band is being wound on the coil 2.

I claim:

1. A reinforced flexible hose comprising: a helically wound form-retaining flexible support coil; an inner hose layer consisting of a flexible ribbon helically wound about the convolutions of said coil, lengthwise marginal portions of said ribbon overlapping each other in juxtaposition with underlying convolutions of the coil; and an outer hose layer consisting of a second flexible ribbon helically wound about the inner layer in the same winding direction as the first ribbon, the lengthwise marginal portions of the second ribbon also overlapping each other in juxtaposition with the underlying coil convolutions, the portions of the ribbons intermediate the overlapping marginal portions thereof being disposed in substantially parallel relationship between adjacent coil convolutions, the overlapping marginal portions of the first ribbon being bonded to each other and to the underlying coil convolutions and the overlapping marginal portions of the second ribbon being bonded to each other and only to the underlying overlapping portions of the first ribbon.

2. A reinforced flexible hose comprising:
a helically wound form-retaining flexible support coil; an inner hose layer consisting of a flexible ribbon helically wound about the convolutions of said coil, lengthwise marginal portions of said ribbon overlapping each other in juxtaposition with underlying convolutions of the coil and the ribbon portion intermediate each two adjacent coil convolutions being convexly arcuate relative to the center axis of the coil; and an outer hose layer consisting of a second flexible ribbon helically wound about the inner layer in the same winding direction as the first ribbon, the lengthwise marginal portions of the second ribbon also overlapping each other in juxtaposition with the underlying coil convolutions and the portion of the second ribbon intermediate the coil convolutions being convexly arcuate relative to the center axis of the coil, the arcuate portion of the second ribbon being nested in the arcuate portion of the first ribbon substantially parallel thereto, the overlapping marginal portions of the first ribbon being bonded to each other and to the underlying coil convolutions and the overlapping marginal portions of the second ribbon being bonded to each other and only to the underlying overlapping portions of the first ribbon.

3. The hose according to claim 2 wherein said overlapping marginal portions of the ribbons are concavely arcuate relative to the center axis of the coil.

4. The hose according to claim 1 wherein one lengthwise edge of the first ribbon terminates in a substantially hook-shaped strip, said strip enveloping at least partly the underlying coil convolutions.

* * * * *